(12) United States Patent
Blazer et al.

(10) Patent No.: US 8,923,676 B2
(45) Date of Patent: Dec. 30, 2014

(54) METHODS OF CONTROLLING JACKET BONDING WITH CABLE ARMOR AND WATER BLOCKING AT STRENGTH MEMBERS

(75) Inventors: Bradley J. Blazer, Granite Falls, NC (US); Jason C. Lail, Conover, NC (US)

(73) Assignee: Corning Cable Systems LLC, Hickory, NC (US)

( * ) Notice: Subject to any disclaimer, the term of this patent is extended or adjusted under 35 U.S.C. 154(b) by 579 days.

(21) Appl. No.: 13/207,991

(22) Filed: Aug. 11, 2011

(65) Prior Publication Data

US 2012/0051702 A1 Mar. 1, 2012

Related U.S. Application Data

(60) Provisional application No. 61/377,585, filed on Aug. 27, 2010.

(51) Int. Cl.
*G02B 6/44* (2006.01)

(52) U.S. Cl.
CPC ............ *G02B 6/4488* (2013.01); *G02B 6/4494* (2013.01)
USPC ............................ 385/113; 385/100; 385/109

(58) Field of Classification Search
USPC ................................ 385/100–114; 427/163.2; 264/1.28–1.29
See application file for complete search history.

(56) References Cited

U.S. PATENT DOCUMENTS 8,577,196 B1 * 11/2013 McNutt .......................... 385/107

* cited by examiner

*Primary Examiner* — Akm Enayet Ullah
*Assistant Examiner* — Michael Mooney

(57) ABSTRACT

An armored cable having a polymer covering where the bond between the armor and the covering is controlled by introducing particulate matter at the interface of the armor and covering. A filler material is applied to the exterior surfaces of the cable strength elements in order to inhibit the formation of voids in the polymer covering that would otherwise promote water migration along the cable.

10 Claims, 6 Drawing Sheets

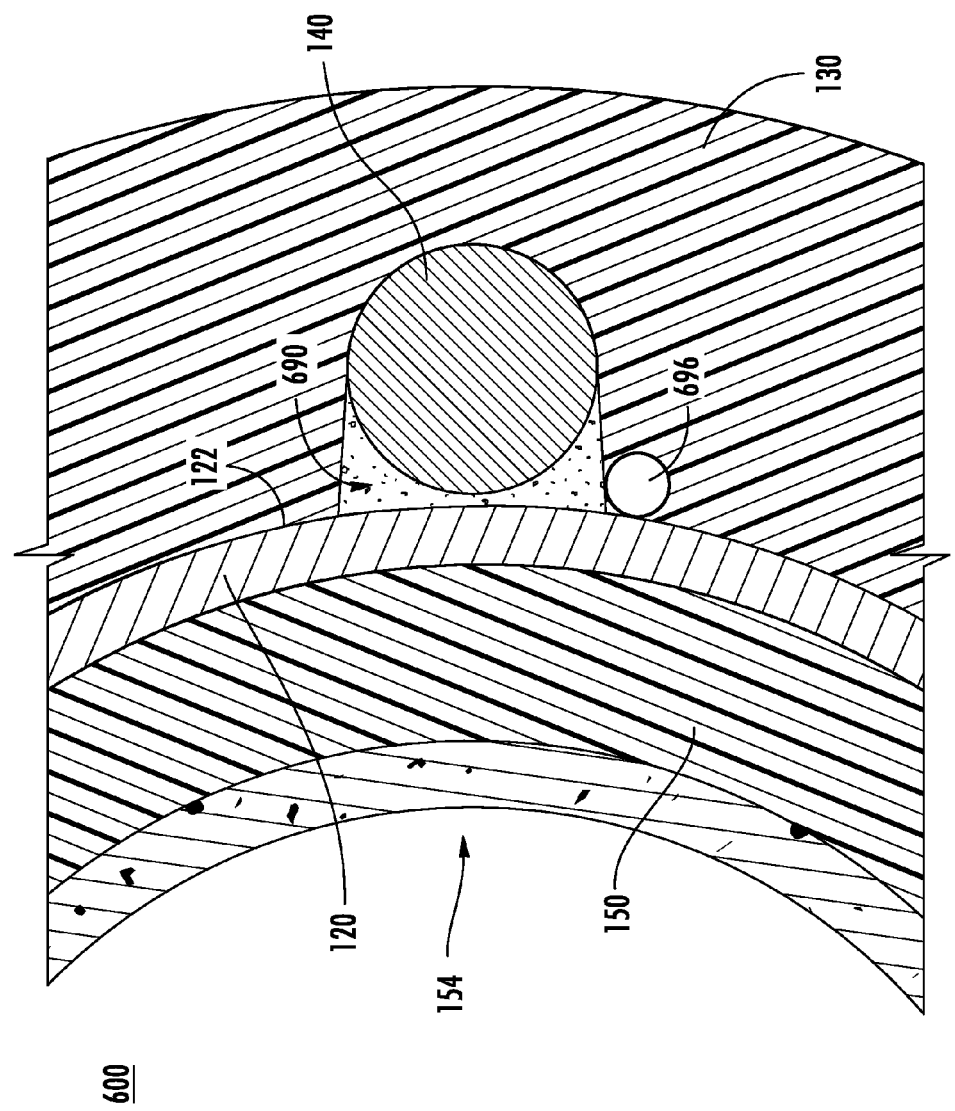

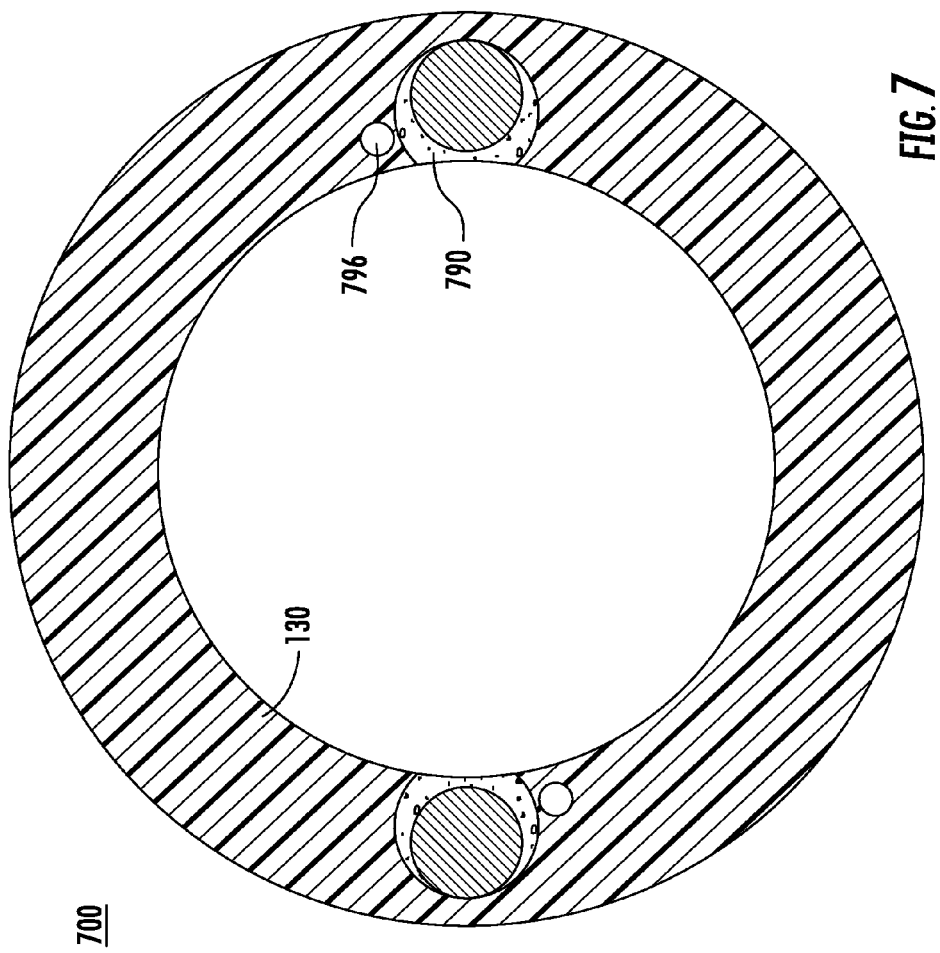

METHODS OF CONTROLLING JACKET BONDING WITH CABLE ARMOR AND WATER BLOCKING AT STRENGTH MEMBERS

RELATED APPLICATIONS

This application claims the benefit of priority under 35 U.S.C. §119 of U.S. Provisional Application No. 61/377,585, filed Aug. 27, 2010, the content of which is relied upon and incorporated herein by reference in its entirety.

RELATED APPLICATIONS

This application is related to U.S. application Ser. No. 12/214,461, filed Jun. 19, 2008 and entitled "FIBER OPTIC CABLE HAVING ARMOR WITH EASY ACCESS FEATURES", U.S. application Ser. No. 12/150,656, filed Apr. 30, 2008 and entitled "FIBER OPTIC CABLE AND METHOD OF MANUFACTURING THE SAME", U.S. App. No. 61/118,196, filed Nov. 26, 2008 and entitled "METHODS OF CONTROLLING BONDING AND ARTICLES FORMED THEREFROM", U.S. App. No. 61/139,187, filed Dec. 19, 2008 and entitled "METHODS OF CONTROLLING BONDING AND WATER BLOCKING IN CABLES", International Application PCT/US09/65760, filed Nov. 24, 2009 and entitled "METHODS OF CONTROLLING BONDING AND ARTICLES FORMED THEREFROM", and U.S. App. No. 61/121,711, filed Dec. 11, 2008 and entitled "CABLE JACKET WITH VARIABLE PERIMETER BOND", the entire contents of these applications being hereby incorporated by reference as if presented herein.

SUMMARY

According to a first embodiment, an armored fiber optic cable comprises a fiber optic cable core including at least one optical fiber capable of conveying optical signals, armor at least partially enclosing the core, particulate matter disposed on an exterior surface of the armor, at least one strength element adjacent to the armor, and a covering over the armor and the particulate matter and at least partially embedding the at least one strength element, wherein filler material covers at least a portion of an exterior of the at least one strength element. The filler material is of different composition than the covering, and is located between the strength element and the fiber optic cable armor to inhibit the formation of voids or channels adjacent to the armor through which water could migrate.

According to one aspect, a method of making an armored fiber optic cable comprises providing a fiber optic cable core including at least one optical fiber capable of conveying optical signals, at least partially enclosing the fiber optic cable core in armor, applying particulate matter to an exterior surface of the armor, providing at least one strength element, applying filler material to the exterior of the strength element, and, after applying the particulate matter, forming a covering over the armor. The at least one strength element is adjacent to the exterior surface of the armor and at least partially embedded in the covering, and the at least one strength element is adjacent to the exterior surface of the armor and at least partially embedded in the covering.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various elements in the drawings may be expanded or reduced to more clearly illustrate the embodiments of the invention.

FIG. 6 is an isolated section view of a portion of a cross section of a cable according to an alternative embodiment.

FIG. 7 is an isolated section view of a portion of a cross section of a cable according to yet another alternative embodiment.

DETAILED DESCRIPTION

Figure 1:
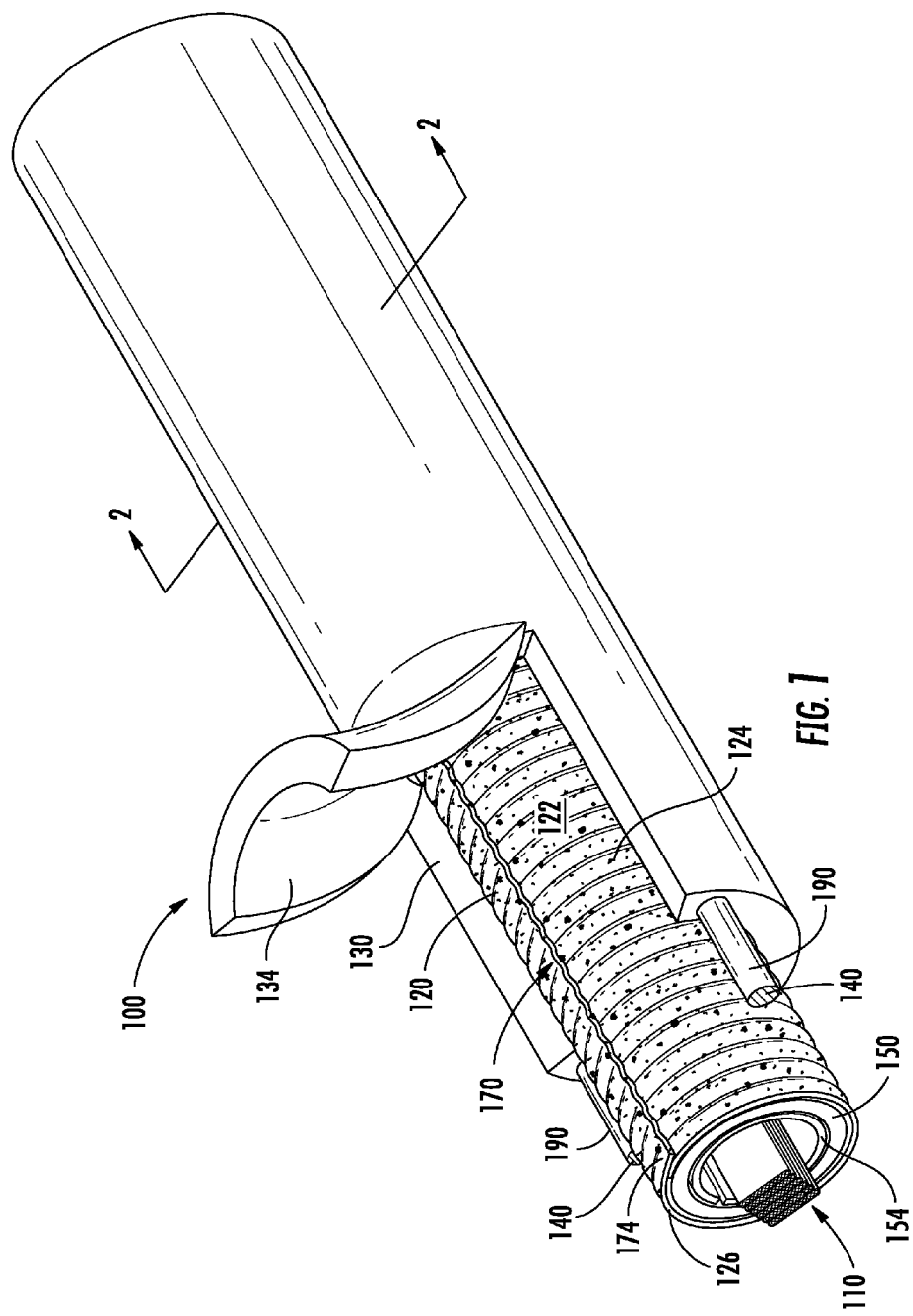
FIG. 1 is a partial cutaway view of a cable according to a first embodiment with a portion of the cable covering pulled away from the cable armor.

Reference will now be made in detail to the present embodiments, examples of which are illustrated in the accompanying drawings. Whenever possible, the same reference numerals will be used throughout the drawings to refer to the same or like parts.

Figure 2:
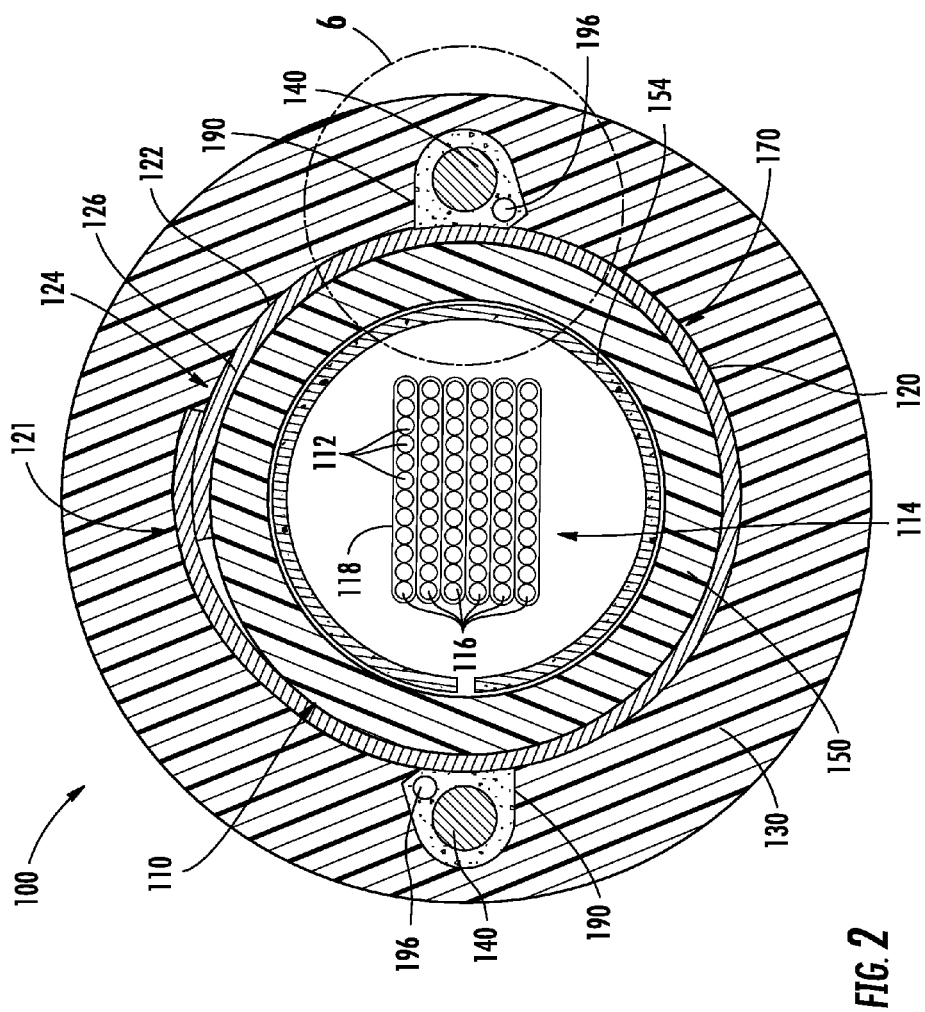
FIG. 2 is a section view of the armored cable of FIG. 1 taken along line 2-2 in FIG. 1.

FIG. 1 is a partial cutaway view of a cable 100 according to a first embodiment. FIG. 2 is a section view of the cable taken on line 2-2 in FIG. 1. Referring to FIGS. 1 and 2, the cable 100 generally comprises a core 110, armor 120 having an overlap 121 and an exterior, abutting surface 122, and a covering 130 surrounding the armor 120 and having an interior, abutting surface 134 in contact with the surface 122 of the armor 120. One or more elongate strength elements 140, such as a pair of strength elements 140 on either side of the core, extend along the length of the cable. The core 110 includes a polymeric buffer tube 150 and a dry insert 154 disposed within the interior of the armor 120 and extending along the length of the cable 100. A second dry insert (not illustrated) can be located between the exterior of the buffer tube 150 and the armor 120.

In the exemplary embodiment, the core 110 also includes one or more optical fibers, each optical fiber having the ability to convey fiber optic communications. The exemplary core 110 can therefore be referred to as a "fiber optic cable core". In the illustrated embodiment, the optical fibers 112 are arranged as a stack 114 of a plurality of optical fiber ribbons 116, each optical fiber ribbon 116 having a row of twelve optical fibers 112 encased in a common ribbon matrix 118. Other arrangements of optical fibers are possible. The dry insert 154 can be, for example, a longitudinally extending foam, felt, cloth, etc. tape. If desired, the buffer tube 150 and dry insert(s) can be omitted to provide ease of access to the ribbon stack 114.

The armor 120 surrounds and protects the core 110 and has a generally tubular shape. The interior of the armor 120 can abut an exterior surface of the core 110, or an intervening dry insert (not shown) may be present between the armor and core. In this specification, the term "armor" does not necessarily indicate a metallic element, and allows for the use of dielectric armors, for example. The armor 120 can include a coating 124 comprising a polymer layer formed over a base armor material 126, the coating 124 serving as the abutting surface 122 of the armor. Alternative and/or additional layers may also be included in the armor 120, so that the armor 120 is actually an armor laminate. The term "armor" is used in this specification for simplicity of description and is intended to encompass armor laminates as are generally known in the art. The structure of an exemplary armor is discussed in detail below with reference to FIG. 4.

Still referring to FIGS. 1 and 2, the covering 130 surrounds and tightly abuts the armor 120 and can be referred to as a "jacket" or "cable jacket." In the exemplary embodiment, the covering 130 is a polymer material formed over the armor 120 by an extrusion process. The polymer used to form the covering 130 can be materials such as, for example, plastics. In the exemplary embodiment, the polymer covering 130 is UV-resistant medium density polyethylene (MDPE). The covering 130 can be generally described as comprising a polymer or as "polymeric", but amounts of other non-polymers can be included in the covering. In this specification, the term "polymeric" allows for the inclusion of additives, and indicates that the covering comprises at least 60% or at least 70% of one or more polymer materials.

Still referring to FIGS. 1 and 2, bonding of the abutting surface 134 of the covering 130 to the armor 120 is controlled using a full or partial application of particulate matter 170 at the interface of the covering 130 and the armor 120. The particulate matter 170 and armor coating 124 may be relatively small and are not visible in FIG. 2. The particulate matter 170 is shown in more detail in FIG. 3 and the armor 120 is shown in more detail in FIG. 4. For the purposes of this specification, the coating 124 on the armor 120, if present, is considered to be part of the armor because armor suppliers often pre-coat the bulk materials used to form such armors before shipping. Polyethylene is a common coating material. Polypropylene is another coating material. If a typical plastic cable jacket material (e.g. MDPE) were extruded directly onto an polyethylene armor coating, a strong thermoplastic bond would be formed between the armor coating and the resultant plastic covering. The bond-controlling particulate matter 170 according to the present invention is applied at the interface of the armor 120 and the covering 130 in order to interrupt and/or weaken the thermoplastic bonding, and thereby facilitate separation of all or a part of the covering 130 from the armor 120 (shown in FIG. 1).

An adherent material layer 174 can be located at the interface of the covering 130 and the armor 120. The adherent 174 can be, for example, a layer formed from a viscous liquid applied to the armor 120 during manufacture of the cable 110. The adherent 174 helps the particulate matter 170 to adhere to the armor 120 exterior surface before the covering 130 is formed over the armor. The adherent material 174 can be a liquid, such as a liquid of medium viscosity. In the exemplary embodiment, the adherent material 174 is an oil. While the adherent material 174 is illustrated on the surface of the armor 120 in FIG. 1, materials such as oils will likely be wholly or substantially incorporated into the covering 130 during extrusion of the covering.

The particulate matter 170 can be comprised of a plurality of individual inorganic or organic particles distributed over all or a part of the surface 122 of the armor 120. The density and arrangement of the particulate matter 170 can be selected to provide a desired degree of bonding between the covering 130 and the armor 120. Suitable inorganic particulates include mineral particulates such as Talc-Hydrated Magnesium Silicate (Talc), clay (e.g., hydrated aluminum silicate), and superabsorbent polymers (SAP) such as are used in fiber optic cable water-blocking applications. An example of a suitable mineral particulate is VANTALC 2500® available from R.T. Vanderbilt Company, Inc. Another suitable particulate is a crosslinked sodium polyacrylate sold under the trade name CABLOC GR-211, available from Evonik, Inc. of Greensboro N.C. Either talc or clay could be mixed with a small percentage of highly hydrophilic SAP particulates to provide water-blocking properties. Corrosion-resistant absorbent powders can be used as a portion of or may comprise all of the bond-controlling particulate matter.

Other than in the vicinity of the strength elements 140, the interface of the covering 130 and the armor 120 can be free of materials such as glues and other materials commonly used as release layers, and the abutting surface 134 of the covering 130 directly contacts the surface 122 of the armor 120 except where the particulate matter 170 (and the thin layer of adherent material 174, if present) is interposed between the armor 120 and the covering 130. The term "abutting" as used herein, accordingly indicates adjacent surfaces of armor and covering layer, allowing for the intervening presence of particulate matter and adherent material, and where the coating 124 is considered to be a part of the armor 120. In the illustrated embodiment, the particulate matter 170 is generally dispersed over the entire surface area of the armor 120, although not necessarily uniformly so. In this specification, when a percentage of a surface or element is described as an application or target area of a surface for application of particulate matter, the percentage refers to a region of the armor surface over which particulate matter is applied to the surface, and not to the total surface area of the surface area actually occupied by particulate.

During extrusion of the covering 130 over the armor 120, a longitudinally extending void or channel would ordinarily form between a strength element 140 and the armor 120. The longitudinally extending voids would present paths for water propagation along the length of the cable 100. According to one aspect of the present embodiments, a filler material 190 is applied to the strength elements 140 before the covering is applied over the armor 120. The filler material 190 can be, for example, a viscous, semi-solid material applied to the surface of the strength elements 140 that is of different material composition than the covering 130. The filler material 190 can be applied over the entire surface of the strength elements 140, as shown in FIGS. 1 and 2. Alternatively, selected portions of the strength elements 140, in particular the portions of the strength element surfaces 140 facing the convex exterior of the armor 120, can have filler material 190 applied thereto.

The filler material 190 is applied to the strength elements 140 in sufficient amounts such that it contacts the surface of the armor 120 and leaves little or no perceptible voids or channels in the covering 130, so that no significant paths for water migration are created in the covering 130. The filler material 190 can cover a length of the surface 122 of the armor 120, when seen in cross section, that is at least 40% of a major dimension of the strength element cross section—which is a strength element diameter in the exemplary embodiment. Referring to FIG. 2, the exemplary filler material 190 covers a length of the armor surface 122 that is greater than 100% of the strength element diameter. A ripcord 196 can be included adjacent to one or both strength members 140 to allow the covering 130 to be more easily removed during cable access. In FIG. 2, the ripcord 196 is enclosed within the filler material 190.

The filler material 190 can be materials such as thermoplastics, elastomerics, and adhesives. In general the filler material 190 has a lower melt temperature than the jacket extrudate material. During extrusion of the filler material, the molten filler material viscosity is significantly lower than that of the extrudate; the melt flow index of the filler material is accordingly higher than that of the extrudate. The lower viscosity allows the filler material to flow freely and fill any voids in the vicinity of the strength elements during extrusion. By contrast, higher viscosity jacket covering materials are less likely to fully flow into the areas between the armor and strength member, unless the line speed is reduced, which also reduces manufacturing efficiency. After cooling in the finished cable, the cohesive strength of the filler material 190 is substantially less than the strength of the covering 130 and the armor laminate materials. The relatively low cohesive strength of the filler material allows separation of the covering 130 during access procedures. According to one aspect, the filler material 190 can be a material of molecular weight of 2500 g/mol or more that is applied as a liquid after heating. The molecular weight of the filler is relatively low when compared to the covering 130, however. For example, the filler material may have a molecular weight in the range of 2,500-5,000 g/mol, while the covering material may be in the range of 5,000-100,000 g/mol. In general, the covering material will have a molecular weight that is at least 10% greater than that of the filler material. In another embodiment, the covering material molecular weight is at least 50% greater than the filler material. The filler material may be relatively stable and not vaporific until heated to 250° C. One filler material 190 is VERSA-WELD™ 34-262 Hot Melt Adhesive available from Henkel Corporation, Bridgewater, N.J.

Figure 3:
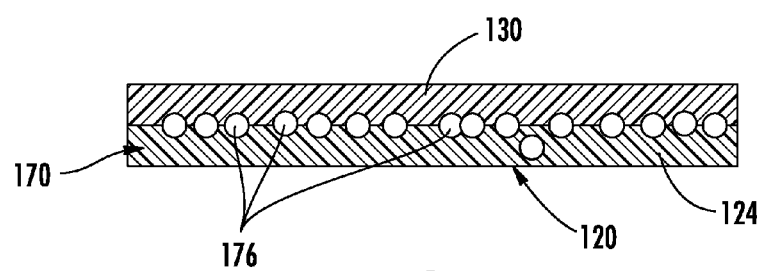
FIG. 3 is a longitudinal section view of the interface of the armor and covering of the cable of FIG. 1.

FIG. 3 schematically illustrates the controlled bonding mechanism provided by the introduction of the particulate matter 170. The section in FIG. 3 can be described as a schematic representation of a highly magnified longitudinal section of a small portion of the interface of the covering 130 and the armor 120, particularly at the coating 124 of the armor. In conventional jacket covering applications, an intermediate layer of glue or other adhesive is applied to the entire armor exterior before extruding a polymer jacket over the armor. In order to access the cable interior in conventional cables, the jacket is separated from the armor at the armor-adhesive-jacket interface, which typically has a high bonding force. According to one aspect of the present embodiment, as schematically represented in FIG. 3, the individual particles 176 of the particulate material 170 interrupt the bonding at the interface of the covering 130 with the armor 120. In FIG. 3, a section of the interface is shown as the bond of the coating 124 of the armor 120 with the covering 130. The covering 130, which is heated to a fully or partially molten state during application over the armor 120, may form a strong thermoplastic bond with the material of the armor coating 124, which can be a polymer such as polyethylene. The particulate material 170 interrupts the interlayer bond between the coating 124 and the covering 130 at a plurality of locations. Each particle 176 (which can be formed from an agglomeration of particles) therefore provides an area where the armor/covering bond can fail relatively easily during separation of the covering 130 from the armor 120. Failure at the armor/particle/covering interfacial locations can be generally referred to as "cohesive failure" because the individual particles 176 or an agglomeration of particles 176 can fail internally (i.e., the particle or agglomeration of particles breaks into separate pieces) to facilitate separation. The individual particles 176 break or undergo cohesive failure as the covering 130 is separated from the armor 120. The failure at the particulate material 170 can also be "adhesive" in that the bond of the particulate matter 170 with the covering 130 and/or with the armor 120 can be relatively low. In FIG. 3, the particles 176 are illustrated as spherical for simplicity of illustration. In practice, the particulate matter can have any shape. As shown in FIG. 3, the individual particles 176 may become at least partially embedded in the covering 130 during extrusion. The particles 176 may also become at least partially embedded in the armor coating 124.

Figure 4:
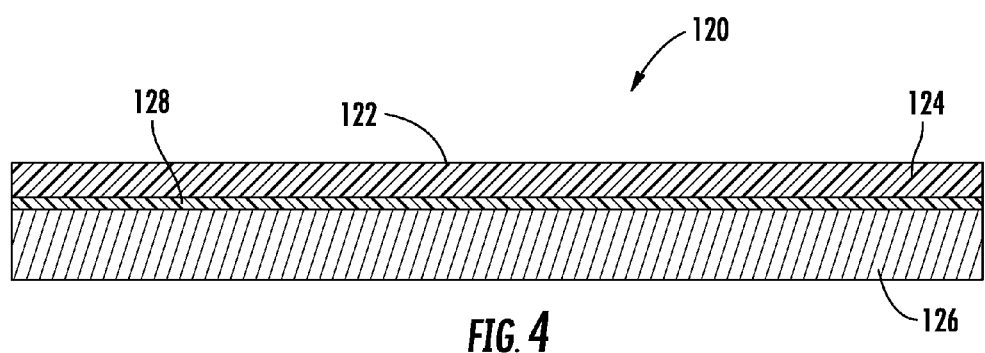
FIG. 4 is a longitudinal section view of armor.

FIG. 4 is a partially schematic longitudinal section view of a portion of the armor 120 used in the cable of FIG. 1. The armor 120 can include a base armor material layer 126 with the coating 124 adhered to the base armor 126 by an adhesive layer 128. The adhesive layer 128 can be, for example, a film of an adhesive such as ethylene acrylic acetate (EAA) copolymer. The coating 124 can include additional layers, and can, for example, be a laminate of multiple films. The base armor material layer 126 can include materials such as metals, dielectrics, etc. In the illustrated embodiments, the base armor 126 is metallic and the coating is a polyolefin.

Figure 5:
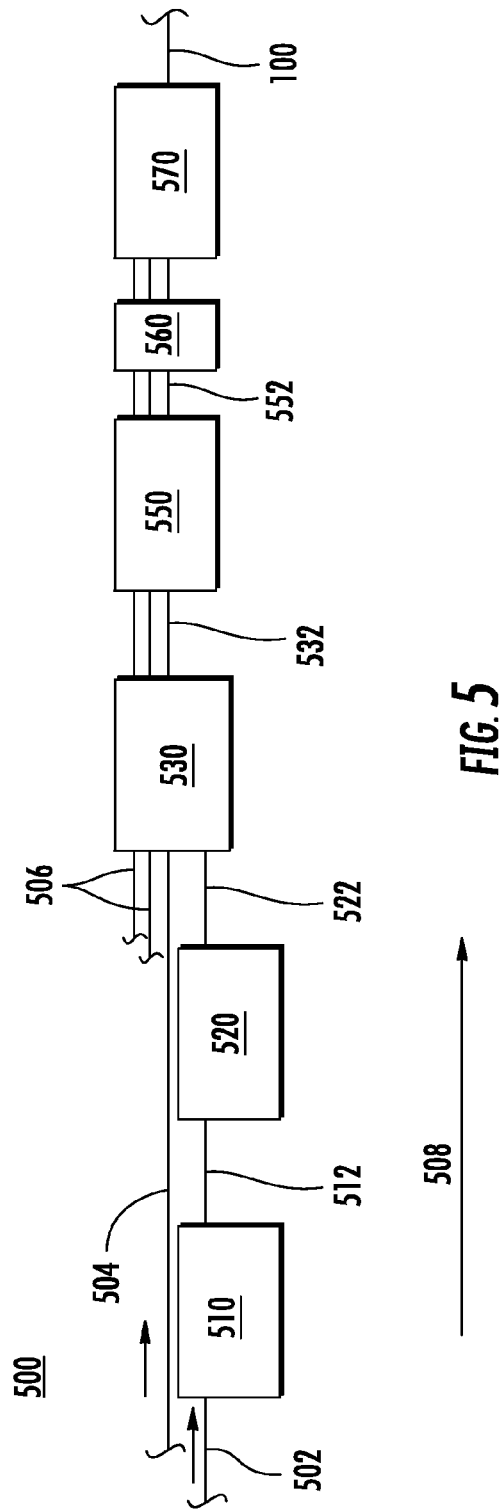
FIG. 5 is a schematic illustration of a manufacturing line suitable for forming cables with controlled bonding between surfaces in the cables.

FIG. 5 illustrates a manufacturing line 500 for forming the cable 100 having controlled bonding of the covering 130 to armor illustrated in FIGS. 1-3. Referring to FIG. 5, a flat sheet 502 of armor material, a core 504, and one or more strength elements 506 are continuously provided generally along the process direction 508. The flat sheet 502 can be a coated metallic, for example, and will ultimately form the cable armor 120. The sheet 502 can include a base armor material covered on one side with a polymer coating adhered by adhesive (e.g., as illustrated in FIG. 4) that forms the armor coating 124. The flat sheet 502 can be paid off from a roll, for example. The core 504 can be any longitudinally extending element that is to be enclosed within an armor and a covering. In the illustrated embodiment, the core 504 is a fiber optic cable core 110 as shown in FIG. 2 including one or more optical fibers and paid off of a spool. In the exemplary embodiment, the strength elements 506 are elongate wire metallic elements of circular cross-section paid off of a spool.

Still referring to FIG. 5, the flat armor sheet 502 is advanced through an applicator 510 where a coating of adherent material is applied to the surface of the flat sheet 502 that becomes the abutting surface 122 (FIG. 1). The adherent can be a liquid such as an oil, and can be applied to the surface of the sheet 502 by a rotating roller that is saturated in the adherent.

The coated sheet 512 then advances into a corrugator 520 that corrugates the sheet 512. The corrugator 520 can be a conventional device, such as a device having two counter-rotating corrugating rollers between which the sheet 512 passes.

The corrugated sheet 522 is advanced into an armor former 530 that forms the armor sheet 512 into a general tube configuration around the core 504 so that it has the configuration shown in FIG. 1. The armor former 530 can be of a conventional configuration, and can include a die of decreasing diameter that continuously concentrically compresses and wraps the armor sheet into a tubular form about the cable core 504. The core 504 is disposed in the interior of the armor tube, with the adherent-coated surface of the armor facing outward.

If desired, the combined armor/core assembly 532 can be advanced through an adherent smoother (not illustrated) that smooths out the adherent on the exterior peripheral surface of the corrugated armor of the assembly 532. One or more high velocity gas jets, for example, can be used to spray air over the adherent to distribute the adherent over the surface of the sheet 522. Brushes may be used alternatively or in addition to gas jets.

The combined armor/core assembly 532 then advances through a particulate applicator 550. The particulate applicator 550 deposits particulate matter onto the surface of the armor tube of the armor/core assembly 532. The adherent coating on the armor of the armor/core assembly 532 helps the particulate matter to adhere to the surface of the armor/ core assembly. The particulate applicator 550 can be a generally enclosed longitudinal cabinet or other structure through which the armor/core assembly 532 travels. Particulate matter can be introduced into the interior of the particulate applicator 550 by gravity, pressurized air, etc. For a general application of particulate over the entire surface of the armor, one or more air nozzles can be in communication with the applicator interior to create swirling or other flow patterns to distribute the particulate matter over the armor/core assembly 532. Alternatively, relatively small nozzles can be used to direct streams of particulate matter targeted to specific application or target areas of the surface of the armor/core assembly 532. Particulate matter can also be applied to the armor surface by passing the armor through a chamber that is in communication with a hollow cylindrical drum (not illustrated). Pressurized gas such as atmospheric air is introduced into the drum so as to create a vortex flow within the drum. An aperture is formed in the drum exterior that is in communication with a supply of particulate matter. The vortex flow creates a partial vacuum that draws in the particulate matter, with the particulate matter mixing in the vortex flow. Centripetal acceleration will cause the particulate matter to circulate at or near the outer periphery of the hollow drum, so the chamber through which the armor passes can be at the outer perimeter of the drum so that the particulate matter has a high chance of impinging on the armor and adhering thereto. In order to more effectively distribute particulate matter over the armor, drums can be arranged sequentially along the manufacturing line so that each drum can direct particulate matter towards a particular section (or arc section) of the armor perimeter. For example, four drums can be arranged sequentially on the manufacturing line, the drums being arranged at 0, 90, 180 and 270 degrees about the armor for targeting separate quadrants of the armor exterior. Alternatively, particulate matter can be simply dropped or gravity-fed over the armor.

The strength elements 506 are advanced through a flooding head 570 where the strength elements are wholly or partially immersed by filler material deposited over the elements 506. The entire exterior surfaces of the strength elements 506 can be targeted for coating by the filler material, or selected regions, such as the regions facing the exterior of the armor, can be covered with filler material. The armor/core assembly 532 can travel through the flooding head 560 with the strength elements 506, and can pass through an enclosed tube so that it is not covered in filler material. Ripcords (not shown), if present, can be advanced into the flooding head 560 in parallel with the strength elements 506. In one embodiment, the filler material is supplied to the flooding head at a rate of 0.1 to 1.0 kg per cable kilometer per strength element.

The armor/core assembly 552 with applied particulate matter, and the coated strength elements 506, are advanced to an extrusion apparatus 570. The extrusion apparatus 570 works according to conventional principles, in which the armor/core assembly 552 is advanced through an extrusion die where extrudate is introduced around the assembly 552. The molten extrudate forms an extrusion cone around the assembly 552 that eventually shrinks radially or draws down and tightly forms onto the exterior surface of the armor of the assembly 552. Alternatively, the extrudate can be introduced under pressure directly onto the exterior surface of the armor assembly 552 as it passes through the extrusion apparatus 570 and as the extrusion die defines the exterior profile of the jacket. The extrudate forms the tubular covering 130 illustrated in FIG. 1. During extrusion, the filler material coating the strength elements contacts and fills voids in the extrudate between the strength elements 506 and the armor of the assembly 552. The assembly can then be advanced through a cooling device such as a trough, the cooled assembly now constituting the cable 100 (FIG. 1). After cooling, the filler material can be bonded to the armor and to the strength element. The cable 100 can then be collected on a take-up device, such as, for example, a take-reel or take-up coiler. As an alternative to coating the strength elements 506 with filler material prior to entering the extrusion head, the filler material can be applied in the extrusion head. The filler material could also be applied directly to the surface of the armor as opposed to the strength members. In this embodiment, the filler material can be applied to the armor adjacent to the strength members but not at other locations of the armor.

The strength elements 506 and filler material can become wholly or partially encased in the covering 130, as shown in the embodiment of FIG. 2. The strength elements 506 can be aligned so that they are closely adjacent to or abut the exterior surface of the armor/core assembly at one or more locations, with the filler material preventing the formation of voids or channels between the strength elements and the armor. Upstream of the extrusion tooling, the strength elements can be spaced from the armor. Without being bound by theory, Applicants believe that excessive impacts of the strength elements with the armor during processing may cause the overlap point 121 to rotate (e.g., rotate so as to deviate from a nominal clock location in FIG. 2) excessively during manufacture.

FIG. 6 is a detailed section view of a portion of a transverse cross-section of a cable 600 according to another embodiment. The cable 600 can be substantially identical to the cable 100 shown in FIGS. 1 and 2, except for the application of filler material to the strength elements. In FIG. 6, the filler material 690 is selectively applied to the surface of the strength elements 140 that faces the convex surface of the armor 120, and is not intentionally applied to the outwardly facing surfaces of the strength elements 140. The ripcords 696 may be outside of the filler material 690, and disposed within the material of the covering 130.

FIG. 7 is a detailed section view of a cable 700 according to another embodiment. The cable 700 can be substantially identical to the cable 100 shown in FIGS. 1 and 2, except for the application of filler material to the strength elements. The ripcords 796 may be outside of the filler material 790, and disposed within the material of the covering 130.

In the illustrated embodiments, the strength elements 140 may be aligned so that they abut, at least intermittently, the corrugated armor 120, or so that the strength elements 140 are very closely spaced with the armor 120. The filler material is intended to fill the area between the strength elements and the core sufficiently to inhibit water migration along the cables, although small voids or channels may be present.

In the illustrated embodiments, the flow rate of particulate matter to the particulate applicator 550, and accordingly the total amount of particulate matter incorporated into the cable, can be varied in order to obtain a desired bond strength at the interface of the covering 130 and the armor 120. In general, the total amount of particulate matter incorporated in a cable will be at least 25 milligrams per meter in cables having diameters in the range of 5 mm to 35 mm. Higher amounts, such as at least 500 mg/m, or even over 2000 mg/m of cable can be used in cables having diameters in the range of 5 mm to 35 mm. For cables having a diameter of 10 mm or more, amounts over 100 mg/m, or over 1000 mg/m or over 2000 mg/m can be used.

EXAMPLE 1

A fiber optic cable 100 as illustrated in FIG. 1 has an MDPE plastic covering 130 extruded over an armor 120 or metallic base material 126 and having a polyethylene coating 124. The particulate matter 170 is a mineral particulate and is applied generally over an application area that is essentially all of the armor exterior surface. The particulate does not cover all of the surface area, and occupies about half of the area of interface of the armor coating 124 and the MDPE covering 130. For a 100 mm$^2$ area of interface between the armor coating 124 and the covering 130, 50 mm$^2$ of the interface area has an interlayer failure mechanism (i.e., thermoplastic bonding of covering to coating) with a relatively high bonding force of 2.0 N/mm$^2$. For the other 50 mm$^2$ of the interface area, the presence of particulate matter 170 at the interface creates regions of cohesive bonding within the compacted particulates having a relatively low bonding force of 1.0 N/mm$^2$. For this estimated example, the average bonding force for the 100 mm$^2$ area of interface is 1.5 N/mm$^2$. The strength elements 140 are formed of steel metallic wire of 1.5 mm diameter rolled off of a spool. The strength elements 140 extend along the length of the cable 100 and at least intermittently contact the surface of the corrugated armor 120. Molten filler material is supplied to a flooding head at a rate in the range of 0.1-1.0 kg per cable kilometer for each strength element 140.

According to the present embodiments, the bond between abutting layers or elements can be controlled by a relatively simple application of particulate matter between the layers. The particulate matter can be delivered by a pneumatic delivery system, which is cheaper than the pump conveyance systems required for adhesives. Further, the bonding force can be relatively easily controlled by varying the amount of particulate matter introduced into the particulate applicator 550, the air flow volumes, patterns and velocities used to mix the particulate matter, the particle size and composition, and other easily managed variables. Also, there is a large selection of particulate matter available at relatively low prices. Filler material introduced between the strength elements and the core exterior prevent or inhibit the formation of channels along the cable that would allow water migration.

Particulates may also be applied to the armor using an electrostatic applicator. For example, the armor can be maintained at a positive charge, and the particulate matter can be oppositely charged and applied to the surface of the armor. This method obviates the need for an adherent.

Particulate matter can also be applied to the surface of the armor by passing the armor through a fluidized bed of particulate matter.

In this specification, the term "particulate matter" is understood to include mixtures of particulates of differing type and/or particle size as well as single composition and size particulates.

The optical fibers employed in the present embodiments may be any suitable type of optical waveguide. Moreover, the optical fibers may be a portion of a fiber optic ribbon, a bundle of optical fibers, or the like.

Alternative particulates include crosslinked sodium polyacrylate available from Absorbent Technologies, Inc. under the tradename AQUAKEEP J550P, copolymers of acrylate and polyacrylamide, graphite, boron, calcium carbonate powder, and flame retardant powders such as aluminum trihydroxide (ATH), and/or the like.

The covering 130 can be made from extrudable materials such as, for example, MDPE, UV-stabilized polyethylenes, etc.

The strength elements 140 in the illustrated embodiments are metallic. Other materials, including dielectrics such as glass-reinforced plastic (GRP) can also be used to form strength elements in accordance with the present embodiments.

The core 110 can be fiber optic core types such as stranded tube cables, monotube cables, micromodule cables, slotted core cables, loose fibers, tube assemblies, loose and stranded tube, tight-buffered fiber, single tube drop cables or the like. Additionally, the cable cores can include any suitable components such as water-blocking or water-swelling components, flame-retardant components such as tapes, coatings, or other suitable components. Fiber optic cable cores may have any suitable fiber count such as a 6-fiber MIC cable or 24-fiber MIC cable available from Corning Cable Systems of Hickory, N.C. Suitable specific fiber optic core cable types include cables sold under the ALTOS® trademark, SST-RIBBON™, and SST-UltraRibbon™ cables available from Corning Cable Systems.

What is claimed is:

1. An armored fiber optic cable, comprising:
   a fiber optic cable core including at least one optical fiber capable of conveying optical signals;
   armor at least partially enclosing the core;
   particulate matter disposed on an exterior surface of the armor;
   at least one strength element adjacent to the armor;
   a covering over the armor and the particulate matter and at least partially embedding the at least one strength element; and
   filler material covering at least a portion of an exterior of the at least one strength element, the filler material being of different composition than the covering, and at least a portion of the filler material being located between the at least one strength element and the armor.

2. The cable of claim 1, wherein the covering comprises a polymer.

3. The cable of claim 2, wherein the particulate matter comprises at least one of mineral particulates and hydrophilic particles.

4. The cable of claim 3, wherein the particulate matter is selected from the group consisting of: superabsorbent polymer, clay, and talc.

5. The cable of claim 2, wherein at a transverse cross section of the cable, the filler material contacts an exterior of the armor along a length of the armor that is at least 40% of a major cross sectional dimension of the at least one strength element.

6. The cable of claim 2, wherein the filler material has a lower melt temperature than that of the covering.

7. The cable of claim 6, wherein the molecular weight of the covering is at least ten percent greater than the molecular weight of the filler material.

8. The cable of claim 6, wherein the molecular weight of the covering is at least fifty percent greater than the molecular weight of the filler material.

9. The cable of claim 2, wherein the at least one strength element comprises a first elongate strength element on a first side of the armor and a second elongate strength element on a second side of the armor.

10. The cable of claim 2, wherein the filler material contacts the armor.

* * * * *